July 19, 1960 R. A. GILBERT 2,945,350
COMBUSTION TURBINE POWER UNITS
Filed April 4, 1956 2 Sheets-Sheet 1

INVENTOR
RONALD A. GILBERT.

BY Watson, Cole, Grindle
& Watson ATTORNEYS

July 19, 1960 R. A. GILBERT 2,945,350
COMBUSTION TURBINE POWER UNITS
Filed April 4, 1956 2 Sheets-Sheet 2

INVENTOR
RONALD A GILBERT

BY Watson, Cole, Grindle
& Watson ATTORNEYS

United States Patent Office 2,945,350
Patented July 19, 1960

2,945,350
COMBUSTION TURBINE POWER UNITS

Ronald Albert Gilbert, North Wembley, England, assignor to D. Napier & Son Limited, London, England, a British company Filed Apr. 4, 1956, Ser. No. 576,101

Claims priority, application France Apr. 7, 1955

4 Claims. (Cl. 60—39.75)

This invention relates to combustion turbine power units of the kind comprising a turbine-driven air compressor and a power turbine disposed at opposite ends of a combustion chamber or series of combustion chambers to which the compressor delivers combustion air and from which the products of combustion pass through the power turbine which is connected through reduction gearing (herein termed the power unit reduction gearing) to a power output shaft. This shaft may be connected, for example, to a propeller of an aircraft or a rotary wing system of a helicopter, either directly or through further reduction gearing hereinafter termed the aircraft reduction gearing. The invention is applicable to such power units whether the compressor is driven by the power turbine or by a separate compressor-driving turbine.

The invention is particularly but not exclusively applicable to combustion turbine power units for driving the rotary wing systems of helicopters in which the power unit is arranged with its axis vertical with the compressor below the turbine or turbines.

In a combustion turbine power unit of the kind referred to according to the present invention the power unit reduction gearing is arranged within a casing disposed on the side of the power turbine remote from the compressor and includes an input shaft coaxial with and directly driven by the power turbine while the power output shaft projects from the side of the casing remote from the power turbine, exhaust ducting is disposed on the side of the power turbine remote from the compressor and between the power turbine and the reduction gearing casing for carrying away the exhaust gases from the turbine or turbines, and a series of circumferentially spaced stress-transmitting members connects the power unit reduction gear casing directly to the turbine casing independently of the exhaust ducting.

In a preferred arrangement the exhaust ducting comprises two diametrically opposite ducts springing from a common annular chamber into which the exhaust outlet of the turbine casing opens, and the stress-transmitting members comprise four arms each extending radially from the power unit reduction gear casing to a part rigid with the turbine casing, two of these arms passing between the two exhaust ducts while the other two pass through tubular sleeves extending respectively across the interiors of the two exhaust ducts.

In one example of an aircraft of the helicopter type incorporating a power unit embodying the invention the power unit is arranged with its axis approximately vertical and with the power turbine above the compressor and with a rotary wing system disposed substantially coaxially with the output shaft of the power unit reduction gearing and driven therefrom.

The invention may be performed in various ways and one particular form of power unit embodying the invention and intended for driving the rotary wing system of a helicopter will now be specifically described by way of example with reference to the accompanying drawings, in which.

Figure 1:
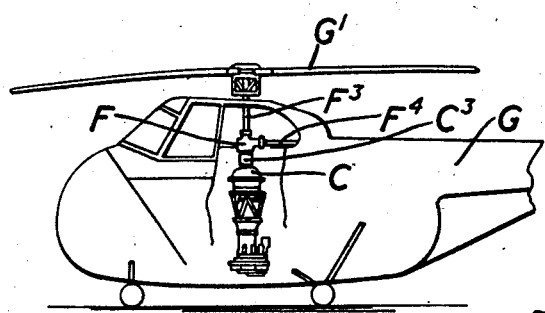
Figure 1 is a fragmentary side view of the helicopter, partly broken away to show the power unit mounted therein.
Figure 2:
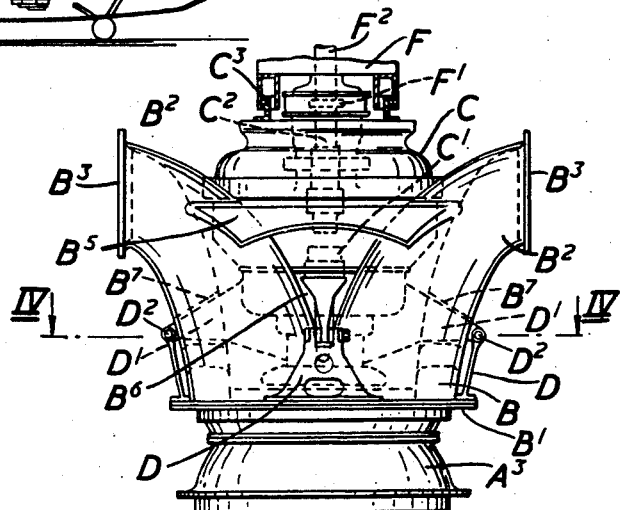
Figure 2 is a side view of the power unit on a larger scale.
Figure 2:
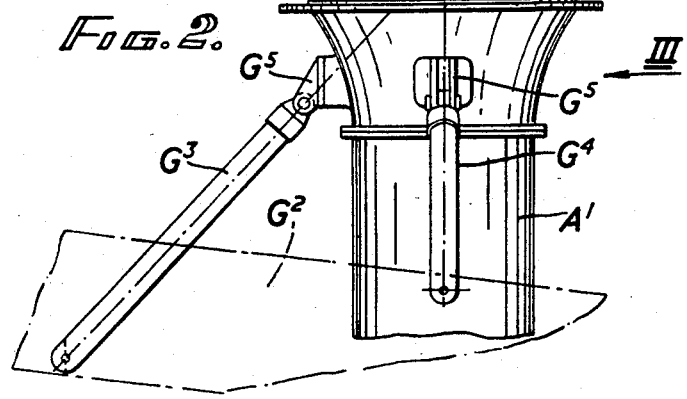
Figure 3:
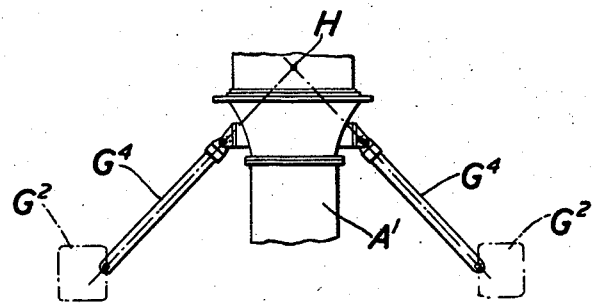
Figure 3 is a front view of the power unit looking in the direction of the arrow III in Figure 2.
Figure 4:
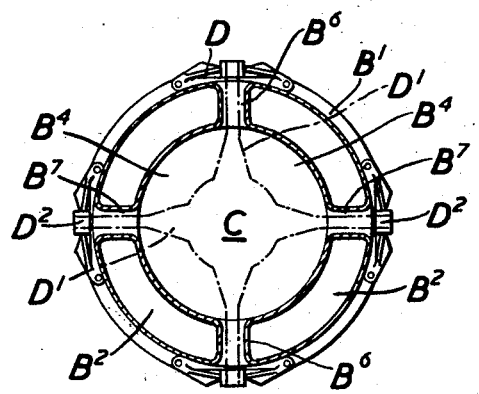
Figure 4 is a cross-section taken on the line IV—IV in Figure 2.

The combustion turbine power unit shown in the drawings comprises an axial flow air compressor, the upper end of the casing of which is shown at $A^1$, having its air inlet at its lower end and delivering air into the lower ends of combustion chambers disposed within an enclosed casing $A^2$ from which combustion chambers the combustion products pass to a power turbine, the casing of which is shown at $A^3$.

Secured to the upper end of the turbine casing $A^3$ so that the exhaust opening of the turbine casing opens into it is exhaust ducting comprising an annular entry section B rigidly secured to a flange $B^1$ of the turbine casing and from which spring a pair of upwardly-extending sections $B^2$ through which the exhaust gases flow to two laterally-facing outlets $B^3$.

Disposed above the exhaust ducting B, $B^2$ is a power unit reduction gear casing C, the lower end of which lies in a space between the two duct sections $B^2$ which for this purpose are formed with concave recesses $B^4$. The power unit reduction gear casing C contains reduction gearing, for example of the epicyclic type, including an input shaft $C^1$ which enters the lower end of the casing C and is directly connected to the adjacent side of the power turbine, and an output shaft $C^2$ coaxial with the input shaft $C^1$ and disposed at the upper end of the casing C where it is coupled through a coupling $F^1$ with the input shaft $F^2$ of aircraft reduction gearing contained in a casing F. From the aircraft reduction gear casing F the drive is transmitted on the one hand through an output shaft $F^3$ to the rotary wing system $G^1$ of the helicopter G and through another output shaft $F^4$ to the tail rotor of the helicopter, which is not shown. The aircraft reduction gear casing F is rigidly connected to the air frame of the helicopter and is connected to the power unit reduction gear casing C through a torque transmitting coupling $C^3$ which is not capable of supporting appreciable weight but which transmits torque reaction from the power unit reduction gear casing C to the air frame through the aircraft reduction gear casing F.

The power unit reduction gear casing C is connected to and supported from the upper end of the turbine casing $A^3$ by four link assemblies each comprising a bracket D. The feet of the brackets D are supported by the flange $B^1$ of the turbine casing. At the upper side of the brackets D are pin connections $D^2$ by which are connected to the brackets D the outer ends of four radial arms $D^1$, the inner ends of which are secured to the power unit reduction gear casing C. Two of the arms $D^1$ pass through V-shaped gaps $B^6$ between the two duct sections $B^2$, while the other two arms pass through tubular housings $B^7$ extending across the interiors of these duct sections.

Stiffening plates $B^5$ connect the two duct sections $B^2$ together at points where these duct sections are sufficiently wide to enable the stiffening plates $B^5$ to clear the power unit reduction gear casing C.

The weight of the power unit is supported by structural members $G^2$ of the helicopter air frame by means of struts $G^3$ and $G^4$ the upper ends of which are connected to brackets $G^5$ rigidly connected to the power unit. The axes of the struts $G^3$ and $G^4$ intersect approximately at the centre of gravity H of the power unit.

The weight of the power unit reduction gear casing C and the parts which it contains is transmitted by the arms D¹ and the brackets D to the turbine casing A³ and thence to the supporting struts G³ and G⁴ and the air frame members G², but the torque reaction of the power unit reduction gear casing is transmitted to the air frame through the torque transmitting coupling C³ and the aircraft reduction gear casing F as already indicated, so that the brackets D do not have to transmit any significant lateral forces.

What I claim as my invention and desire to secure by Letters Patent is:

1. A combustion turbine power unit comprising at least one combustion chamber having an inlet end and an outlet end, a compressor disposed at the inlet end of said combustion chamber and adapted to deliver combustion air thereto, a power turbine disposed at the outlet end of said combustion chamber to receive combustion products therefrom, a casing containing said power turbine, said turbine casing having an inlet side adjacent said combustion chamber and an exhaust side away from said combustion chamber, a reduction gear forming part of said power unit, a casing containing said power unit reduction gear disposed on the exhaust side of said turbine casing and having an input side adjacent said turbine casing and an output side away from said turbine casing, an input shaft which enters the input side of said power unit reduction gear casing and which is connected to said power turbine, an output shaft projecting from the output side of said power unit reduction gear casing, exhaust ducting disposed on the exhaust side of said turbine casing between said turbine casing and said power unit reduction gear casing, and a plurality of circumferentially spaced stress-transmitting members connecting said power unit reduction gear casing directly to said turbine casing independently of said exhaust ducting.

2. A combustion turbine power unit according to claim 1 in which said exhaust ducting comprises a common annular exhaust chamber on the exhaust side of said turbine casing, two diametrically opposite ducts springing from said common annular exhaust chamber, and tubular sleeves extending transversely across the interiors of said two exhaust ducts, and in which said stress-transmitting members comprise four arms each extending radially from said power unit reduction gear casing, two of these four arms passing between said two opposite exhaust ducts and the other two of said arms passing through said tubular sleeves.

3. A combustion turbine power unit according to claim 2 in which there are four brackets rigidly secured to said turbine casing, and means connecting said brackets to said radially extended arms.

4. A combustion turbine power unit according to claim 1, in which said stress-transmitting members comprise four arms each extending radially and at right angles to each other from said power unit reduction gear casing, and brackets connecting the outer extremities of said radially extending arms to said turbine casing, said brackets being rigid with said turbine casing in the circumferental direction but capable of movement in the radial direction.

References Cited in the file of this patent
UNITED STATES PATENTS

| | | |
|---|---|---|
| 2,514,206 | Perry | July 4, 1950 |
| 2,537,623 | Campbell | Jan. 9, 1951 |
| 2,626,766 | McDonald | Jan. 27, 1953 |
| 2,689,615 | Fletcher | Sept. 21, 1954 |

FOREIGN PATENTS

| | | |
|---|---|---|
| 1,029,081 | France | May 29, 1953 |
| 1,057,506 | France | Mar. 9, 1954 |